(12) United States Patent
Plankey et al.

(10) Patent No.: US 9,865,007 B2
(45) Date of Patent: Jan. 9, 2018

(54) SYSTEM AND METHOD FOR MANAGING MULTIMEDIA SALES PROMOTIONS

(71) Applicants: James E. Plankey, Arlington Heights, IL (US); Thomas G. Galaher, Lake St. Louis, MO (US)

(72) Inventors: James E. Plankey, Arlington Heights, IL (US); Thomas G. Galaher, Lake St. Louis, MO (US)

( * ) Notice: Subject to any disclaimer, the term of this patent is extended or adjusted under 35 U.S.C. 154(b) by 458 days.

(21) Appl. No.: 14/313,171

(22) Filed: Jun. 24, 2014

(65) Prior Publication Data

US 2015/0371286 A1 Dec. 24, 2015
US 2017/0091830 A9 Mar. 30, 2017

Related U.S. Application Data

(63) Continuation-in-part of application No. 13/858,730, filed on Apr. 8, 2013, now abandoned.

(60) Provisional application No. 61/838,684, filed on Jun. 24, 2013, provisional application No. 61/641,737, filed on May 2, 2012.

(51) Int. Cl.
| | |
|---|---|
| *G06F 17/30* | (2006.01) |
| *G06Q 30/02* | (2012.01) |
| *G11B 27/031* | (2006.01) |
| *G06T 11/60* | (2006.01) |

(52) U.S. Cl.
CPC .......... *G06Q 30/0276* (2013.01); *G06T 11/60* (2013.01); *G11B 27/031* (2013.01)

(58) Field of Classification Search
CPC ......... G06F 17/30247; G06F 17/30876; G06F 21/78; G06F 17/30056; G06F 17/3002; G06F 17/218; G06F 17/24
See application file for complete search history.

(56) References Cited

U.S. PATENT DOCUMENTS

| | | | | |
|---|---|---|---|---|
| 2001/0034690 | A1* | 10/2001 | Joseph ................... | G06Q 30/06 705/37 |
| 2002/0120506 | A1* | 8/2002 | Hagen .................... | G06Q 30/02 705/14.41 |
| 2004/0139318 | A1* | 7/2004 | Fiala .................. | G06Q 20/3558 713/165 |
| 2007/0028172 | A1* | 2/2007 | Greer ................ | G06F 17/30056 715/705 |

(Continued)

OTHER PUBLICATIONS http://web.archive.org/web/20120411150623/http://automobiles.honda.com/tools/build-price/models.aspx, Honda, Apr. 11, 2012, wayback Machine.*

*Primary Examiner* — Angelica Ruiz
(74) *Attorney, Agent, or Firm* — Creativenture Law, LLC; Dennis J M Donahue, III

(57) ABSTRACT

A system for managing multimedia sales promotions includes an inventory database containing photos and videos of items in a sales inventory. A distribution server that distributes the photos and videos. The system further includes a computer having an input device that receives input from a user. The computer further includes an item selector that selects an item in the inventory based on a user input. The computer further includes a photo editor that edits photos based on a user input. The computer further includes a video editor that adds a soundtrack to the videos based on a user input. The computer further includes a display that displays the photos and videos and interfaces for the photo editor and video editor to the user.

20 Claims, 2 Drawing Sheets

(56) References Cited

U.S. PATENT DOCUMENTS

| | | | |
|---|---|---|---|
| 2010/0030578 A1* | 2/2010 | Siddique | G06Q 10/0637 |
| | | | 705/3 |
| 2010/0153198 A1* | 6/2010 | Murphy | G06Q 30/02 |
| | | | 705/14.15 |
| 2011/0113363 A1* | 5/2011 | Hunt | G06F 3/0481 |
| | | | 715/800 |
| 2011/0238495 A1* | 9/2011 | Kang | G06Q 30/02 |
| | | | 705/14.49 |
| 2013/0215116 A1* | 8/2013 | Siddique | G06Q 30/0643 |
| | | | 345/420 |

* cited by examiner

SYSTEM AND METHOD FOR MANAGING MULTIMEDIA SALES PROMOTIONS

TECHNICAL FIELD

The system and method described herein relate to the field of sales, more particularly, to the field of multimedia sales promotions.

BACKGROUND

It is often useful in sales to provide immersive promotional materials to entice potential buyers. This is particularly true in automotive sales. It is well known in the field that ads featuring more pictures of the vehicle will attract more attention, and if at auction, command a higher price. This is true in part because it is important for the customer to get a detailed understanding of the visual condition of the vehicle. Even more importantly, detailed photographs implant imagery of the vehicle in the prospective buyer's mind and implant them with the "fantasy" of owning the vehicle.

Automotive retailers have taken this concept a step further and are now integrating video tours of their vehicles in their classifieds and promotional materials. Video is becoming the first media choice for prospective buyers on the web and mobile devices. 80% of all auto shoppers pursue online videos in their research, and half of all car shoppers watch at least thirty minutes of video during the buying process.

Moreover, video has the potential to motivate buyers like no other media. A video gives shoppers the sense that they're standing beside the car. They can see it, hear it, learn about it, almost touch it—they may even dream about it. A well-made video helps a buyer visualize owning the car. Buyers will research countless sites before narrowing their selection, and when they're ready to move they typically only visit one or two dealers. That is why it is absolutely critical for retailers make an impression on potential buyers with their classifieds.

Organizing the various media on the vehicles in an inventory is a difficult task. This is particularly true when video or pictures are custom edited for particular consumers, and multiple salespersons make changes to the content. In the current market, retailers don't have a complete custom solution to edit photos, incorporate additional sound tracks to existing video, and accommodate multiple users. Once the original photos and video are taken, they cannot be edited and organized by the retailer in a convenient manner. A voiceover may not be done in the field because of wind noise, or an airplane flying overhead distorting the recording.

There is a need in the art for a convenient way to organize multimedia promotional materials for large stocks of merchandise.

BRIEF SUMMARY

A system for managing multimedia sales promotions includes an inventory database containing photos and videos of items in a sales inventory. The system further includes a distribution server that distributes the photos and videos. The system further includes a computer having an input device that receives input from a user. The computer further includes an item selector that selects an item in the inventory based on a user input. The computer further includes a photo editor that edits photos based on a user input. The computer further includes a video editor that adds a soundtrack to the videos based on a user input. The computer further includes a display that displays the photos and videos and interfaces for the photo editor and video editor to the user.

In some embodiments, the computer further includes a photo sorter that sorts a collection of photos of an item in the inventory based on a user input. In some embodiments, the computer further includes a photo adder that adds photos to a collection of photos of an item in the inventory based on a user input and a photo deleter that deletes photos from the collection based on a user input. In some embodiments, the computer further includes a brochure generator that generates a brochure for an item with the photos and videos based on a user input. In some embodiments, the distribution server distributes the photos and videos to a retailer website, third-party marketing services, individuals, and social media portals. In some embodiments, the inventory is a vehicle inventory and the item is a vehicle. In some embodiments, the computer is a smartphone.

A method of generating a digital brochure includes retrieving a collection photos and videos relating to an item from an inventory database via software executing on a computer. The method further includes editing the photos via software executing on a computer. The method further includes recording a voiceover track for a video in the collection. The method further includes adding the voiceover track to the video via software executing on a computer. The method further includes generating the digital brochure using the photos and videos via software executing on a computer.

In some embodiments, the method further includes editing individual photos. In some embodiments, the method further includes adding a photo to the collection. In some embodiments, the method further includes deleting a photo from the collection. In some embodiments, the method further includes sorting the collection of photos. In some embodiments, the method further includes displaying at least one item from the inventory database. In some embodiments, the inventory is a vehicle inventory and the item is a vehicle. In some embodiments, the computer is a smartphone.

DETAILED DESCRIPTION

Figure 1:
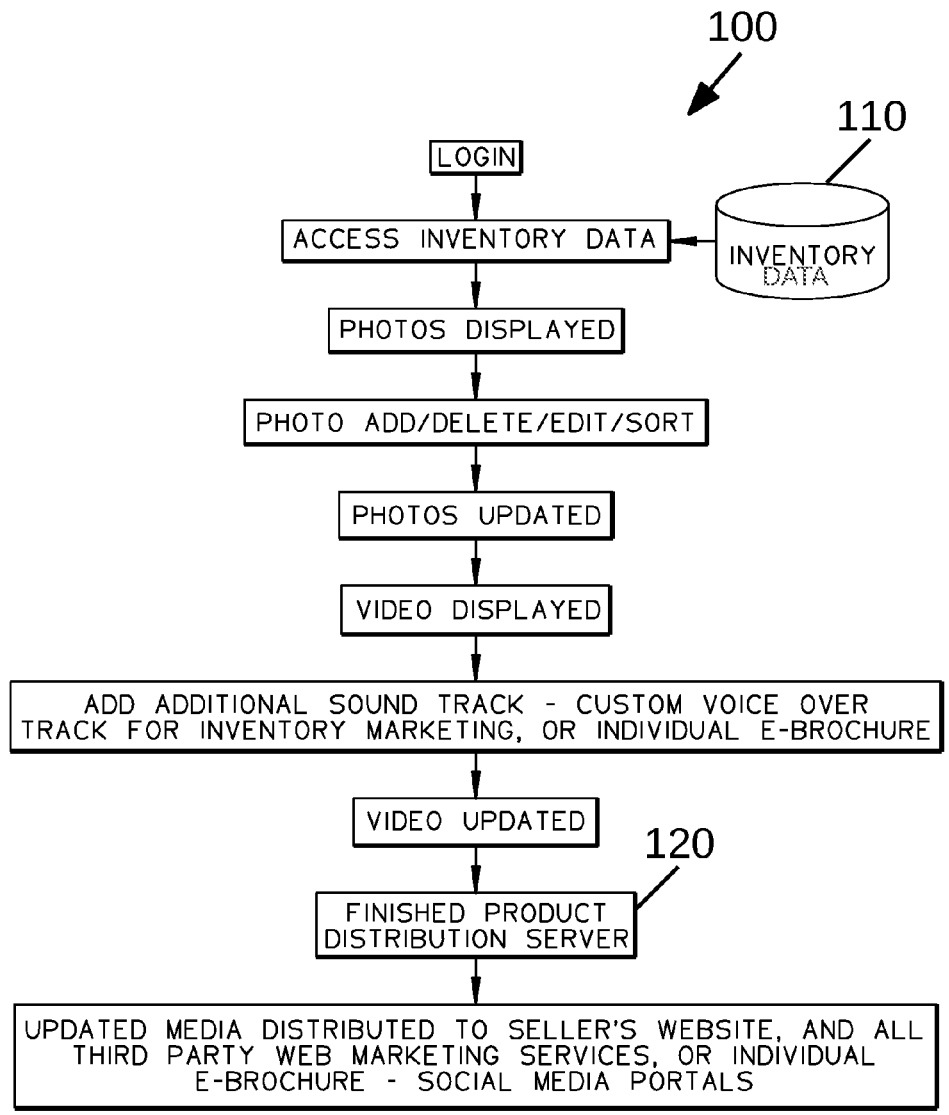
FIG. 1 is a block diagram of the system and method according to one embodiment.

FIG. 1 shows a block diagram of the system 100 according to one embodiment. A user (a member of the sales staff in several embodiments) logs into system 100. The user can then access the inventory data from inventory database 110. System 100 can then display photos of items in sales inventory 110 to the user. The user can add, edit, delete, or sort the photos. System 100 can then update the photo based on the user's changes.

System 100 can also display videos of items in inventory database 110 to the user. System 100 allows the user to add a soundtrack to the videos in the system. This soundtrack includes a custom voiceover from the user in this embodiment. This custom video can then be used for inventory marketing or for a customized digital brochure for an individual client. Software then updates the videos based on the user's changes.

The updated media is then sent to distribution server 120. Distribution server 120 distributes media to the retailer website, third-party web marketing services, individual digital brochures, and/or social media portals.

Figure 2:
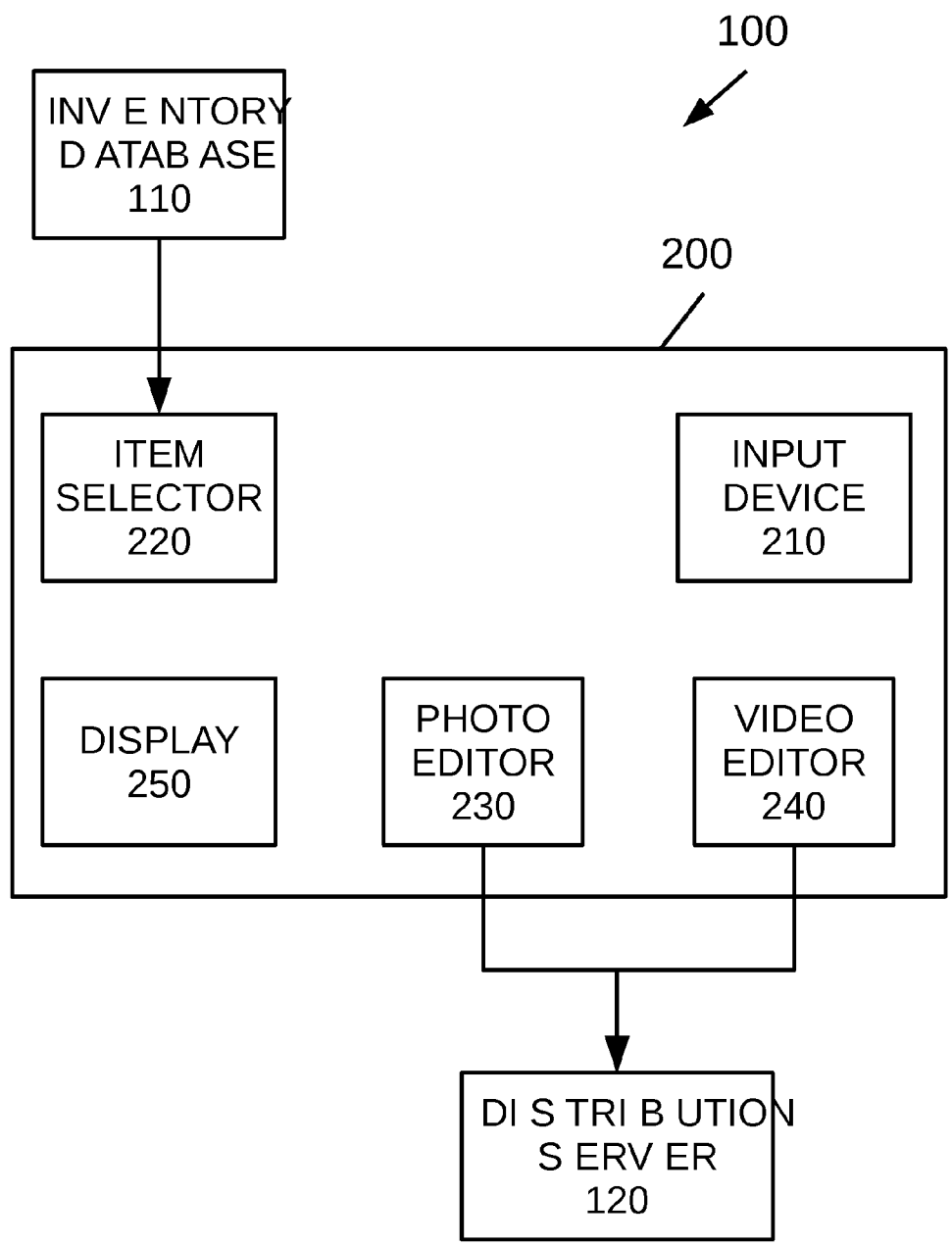
FIG. 2 is a block diagram of the system according to the embodiment shown in FIG. 1.

As shown in FIG. 2, system 100 comprises inventory database 110, distribution server 120, and computer 200. Computer 200 comprises an input device 210 that obtains input from the user, and display 250 that displays a user interface for the software to the user. Computer 200 further comprises a photo editor 230 that edits photos based on a user input, and a video editor 240 that edits video based on a user input.

Photo editor 230 allows the user to edit a collection of photos for an item in inventory database 110. Photo editor 230 can sort photos in a collection, add photos to the collection, delete photos from the collection, or edit individual photos. Editing individual photos may involve cropping, altering the exposure, altering the balance, adding a marque or making other changes. In some embodiments, display 250 displays a photo icon and a sorting window to the user.

In some embodiments, video editor 240 can add a recorded voiceover to a video in inventory database 110. This allows the salesperson to create a guided video tour of the product, which in many embodiments will be a vehicle. In some embodiments, a voice over video viewing window is displayed to the user via display 250. In some embodiments, video editor 240 can make other changes to the videos based on user input—such as cropping, adding a marque, adding wipes, adding or deleting footage, adding written captions, etc. . . . .

Item selector 220, photo editor 230, and video editor 240 are presented to the user via display 250 in the form of a multimedia dashboard. This provides a central user interface with which a user or salesperson can manage complex promotional materials for a large inventory of items.

In some embodiments, computer 200 is a smartphone or tablet, and the software running thereon is an application. In that embodiment, input device 210 would be a touchscreen and display 250 would be the device's screen.

Moreover, this system 100 can be used to create custom digital brochures for each item, so that promotional materials can be tailored to an individual buyer for a given item. Once the photos and videos have been edited, and the digital brochures generated, the materials are uploaded to distribution server 120. Distribution server 120 distributes media to the retailer website, third-party web marketing services, individual digital brochures, and/or social media portals.

This system 100 allows sellers a one, or two-tier edit feature, and the ability to customize their media marketing in-house, eliminating the need to outsource this process. It also allows retailers to generate more immersive and custom-tailored promotional materials that more effectively entice potential buyers. Furthermore, this system 100 tracks the changes that multiple users make to the promotional materials, increasing the pool of creative input and improving the organization of the system. Furthermore, it enables easier division of labor, as one member of the staff could shoot video and photos, while another member edits the videos and photos to finalize the promotional materials. The system 100 can also be used to create how-to information and tutorials due to its simple yet powerful editing and production features. Finally, it enables retailers to easily perform post-editing in a controlled environment such as a quiet office.

Although the invention has been described with reference to embodiments herein, those embodiments do not limit the invention. Modifications to those embodiments or other embodiments may fall within the scope of the invention.

What is claimed is:

1. A system for managing multimedia sales promotions by members of a sales staff, comprising:
   an inventory database including a first set of photos and videos of items in a sales inventory;
   a distribution server in communication with the inventory database that distributes the first set of photos and videos;
   a first computer in communication with the inventory database and the distribution server, the first computer including:
      an input device that receives a set of inputs from a first user, wherein the first user is a first member of the sales staff;
      an item selector that selects an item in the sales inventory from the inventory database based on a first input by the first user, wherein the first input is in the set of user inputs;
      a photo editor that edits photos for the item based on a second input by the first user, wherein the second input is in the set of user inputs;
      a video editor that adds a first custom soundtrack to a first video for the item based on a third input by the first user to produce a first custom video, wherein the third input is in the set of user inputs;
      wherein the item selector, the photo editor, and the video editor are all within a single multimedia dashboard, and wherein the first user enters a fourth input to the single multimedia dashboard and the first computer uploads the first custom video to the distribution server; and
      a display that displays the first set of photos and videos and interfaces for the photo editor and video editor to the first user with the item selector in the single multimedia dashboard; and
   a second computer operated by a second user and in communication with the inventory database and the distribution server, wherein the second user is a second member of the sales staff, wherein the first custom video is accessed by the first user with the first computer and by the second user with the second computer, and wherein the first user and the second user independently of each other operate the single multimedia dashboard on the respective first computer and second computer to communicate with the distribution server and produce a first distribution of the first custom video to a first set of potential buyers and a second distribution of the first custom video to a second set of potential buyers, respectively.

2. The system of claim 1, wherein the second computer further comprises the single multimedia dashboard with the item selector, the photo editor, and the video editor, wherein at least one of the first computer and the second computer is a mobile computer comprising a video shooting module, a photo shooting module, and a sound recording module, and wherein the single multimedia dashboard is in operative communication with the video shooting module, the photo shooting module, and the sound recording module.

3. The system of claim 2, wherein the single multimedia dashboard on the first computer and on the second computer further comprises:
   a photo sorter that sorts a collection of photos of the item in the inventory database based on a fifth input by at least one of the first user and the second user;

a photo adder that adds photos to the collection of photos of the item in the inventory based on a sixth input by at least one of the first user and the second user; and a photo deleter that deletes a set of photos from the collection of photos based on a seventh input by at least one of the first user and the second user; and wherein a second set of photos and videos in the sales inventory are created with the item selector, the video shooting module, and the photo shooting module operated by the second user, wherein a second custom video is created with the item selector, the photo editor, and the video editor by the first user, and wherein the second custom video can be accessed by the first user and the second user through the first computer and the second computer, respectively.

4. The system of claim 2, wherein the single multimedia dashboard on the first computer and on the second computer further comprises:

a brochure generator that generates a brochure for the item with the photos and videos based on another user input;

wherein the brochure is accessed by the first user with the first computer and by the second user with the second computer, wherein the first user uses the first custom soundtrack for the brochure for the first set of potential buyers, wherein the second user creates a second custom soundtrack tailored for an individual client in the second set of potential buyers.

5. The system of claim 1, wherein the distribution server distributes the photos and videos to at least one of a retailer's website, third-party marketing services, individuals in at least one of the first set of potential buyers and the second set of potential buyers, and social media portals.

6. The system of claim 1, wherein the inventory is a vehicle inventory, the item is a vehicle, the first custom video includes a guided video tour of the vehicle, and the first custom video is tailored for an individual client in at least one of the first set of potential buyers and the second set of potential buyers.

7. The system of claim 1, wherein the first computer and the second computer are a mobile computer selected from the group of computers consisting of a smartphone and a tablet, wherein the single multimedia dashboard is presented on the display of the mobile computer as a central user interface, wherein the mobile computer comprises a video shooting module, a photo shooting module, and a sound recording module, wherein the single multimedia dashboard is in operative communication with the video shooting module, the photo shooting module, and the sound recording module.

8. A method of generating and distributing a digital brochure, comprising:

retrieving a collection of photos and videos relating to an item in an inventory database via a multimedia dashboard software executing on a computer, wherein the computer is operatively communicating with a distribution server in communication with the inventory database;

editing at least one of the photos in the collection via the multimedia dashboard software executing on the computer to produce at least one edited photo;

recording a custom voiceover track for a video in the collection using the multimedia dashboard software executing on the computer;

adding the custom voiceover track to the video via the multimedia dashboard software executing on the computer to produce a custom video;

generating, via the multimedia dashboard software executing on the computer, the digital brochure, the digital brochure including the at least one edited photo and the custom video;

uploading the digital brochure from the computer to the distribution server in communication with the inventory database; and managing a distribution of the digital brochure to a set of potential buyers by the distribution server with the multimedia dashboard software executing on the computer.

9. The method of claim 8, wherein the computer is a first mobile computer comprising a video shooting module, a photo shooting module, and a sound recording module, wherein the single multimedia dashboard is in operative communication with the video shooting module, the photo shooting module, and the sound recording module, and wherein the single multimedia dashboard controls the sound recording module of the mobile computer during the recording step.

10. The method of claim 9, further comprising the steps of adding a new photo to the collection from a second mobile computer and adding a new video to the collection from the second mobile computer.

11. The method of claim 10, wherein the step of adding the new photo further comprises the steps of shooting the new photo of a new item in the inventory database via the single multimedia dashboard in communication with the photo shooting module and uploading the new photo from the mobile computer to the inventory database, and wherein the step of adding the new video further comprises the steps of shooting the new video of the new item in the inventory database via the single multimedia dashboard in communication with the video shooting module and uploading the new video from the mobile computer to the inventory database.

12. The method of claim 10, further comprising the step of retrieving the new photo and the new video from the inventory database via the multimedia dashboard software executing on the first mobile computer.

13. The method of claim 10, further comprising the step of managing the distribution of the digital brochure to a new set of potential buyers by the distribution server with the multimedia dashboard software executing on the second mobile computer.

14. The method of claim 8, wherein the inventory is a vehicle inventory, the item is a vehicle, the custom video includes a guided video tour of the vehicle, and the custom video is intended for an individual client.

15. The method of claim 8, further comprising the step of executing the multimedia dashboard software on a first mobile computer and a second mobile computer, wherein a first custom voiceover track is added to the video through the first mobile computer to produce a first digital brochure, wherein a second custom voiceover track is added to the video through the second mobile computer to produce a second digital brochure, and wherein the managing step is further comprised of managing a first distribution of the first digital brochure to a first set of potential buyers with the first mobile computer and managing a second distribution of the second digital brochure to a second set of potential buyers with the second mobile computer.

16. A system for managing multimedia sales promotions by members of a sales staff, comprising:

an inventory database of items being sold that includes a first set of photos and videos of the items in a sales inventory;

a distribution server in communication with the inventory database that distributes the first set of photos and videos;

a first computer in communication with the inventory database and the distribution server, the first computer including:

an input device that receives a set of inputs from a first user, wherein the first user is a first member of the sales staff;

an item selector that selects a first item from the items in the inventory database for the sales inventory based on a first input by the first user, wherein the first user input is in the set of user inputs;

a photo editor that adds photos and edits at least one of the photos for the first item based on a second input by the first user to create a first updated photo, wherein the second input is in the set of user inputs;

a video editor that adds a first soundtrack to at least one of the videos for the first item based on a third input by the first user to create a first custom video; and a display that displays the first set of photos and videos and interfaces for the photo editor and video editor to the first user with the item selector, wherein the item selector, the photo editor, and the video editor are all incorporated into a single multimedia dashboard running on the first computer as a software application, and wherein the first user enters a fourth input to the single multimedia dashboard and the first computer uploads the first custom video to the distribution server; and a second computer in communication with the inventory database and the distribution server through the single multimedia dashboard running as the software application on the second computer and operated by a second user, wherein the second user is a second member of the sales staff and the second computer is a mobile computer, wherein the second computer records a second set of photos and videos for a second item and communicates the second set of photos and videos to the inventory database, wherein the first computer retrieves a second photo from the second set of photos to create a second updated photo and retrieves at least one of the videos from the second set of videos to combine with a second custom soundtrack to create a second custom video.

17. The system of claim 16, wherein the first custom video is accessed by the first user with the first computer and by the second user with the second computer, and wherein the first user and the second user independently of each other produce through the distribution server a first distribution of the first custom video to a first set of potential buyers and a second distribution of the second custom video to a second set of potential buyers, respectively.

18. The system of claim 17, further comprising a third custom soundtrack produced on the second computer and added to a selected one of the first videos for the first item through the single multimedia dashboard to form a third custom video tailored for an individual client in the second set of buyers, and a third distribution of the third custom video to the individual client.

19. The system of claim 16, wherein the first computer and the second computer each presents the item selector, the photo editor, and the video editor on the display in the multimedia dashboard as a central user interface to the inventory database and the distribution server.

20. The system of claim 16, wherein the photo editor further includes at least one of an image cropping function, an image exposure function, an image balance function, and a marque adding function, and wherein the video editor further includes at least one of a video cropping function, a marque adding function, a wipe adding function, a footage add/delete function, and a written caption function.

* * * * *

UNITED STATES PATENT AND TRADEMARK OFFICE
CERTIFICATE OF CORRECTION

| | |
|---|---|
| PATENT NO. | : 9,865,007 B2 |
| APPLICATION NO. | : 14/313171 |
| DATED | : January 9, 2018 |
| INVENTOR(S) | : James E. Plankey and Thomas G. Gallaher |

It is certified that error appears in the above-identified patent and that said Letters Patent is hereby corrected as shown below:

On the Title Page

Column 1 item (72) Inventors should read: "Thomas G. Gallaher, Lake St. Louis, MO (US)"

Signed and Sealed this
Eighth Day of May, 2018

Andrei Iancu
*Director of the United States Patent and Trademark Office*